United States Patent
Viganotti

(10) Patent No.: US 11,436,575 B2
(45) Date of Patent: Sep. 6, 2022

(54) VIRTUAL WALLET FOR CUSTOMER PREMISE EQUIPMENT DEVICE

(71) Applicant: ARRIS Enterprises LLC, Suwanee, GA (US)

(72) Inventor: Gabriel Viganotti, Cordoba (AR)

(73) Assignee: ARRIS Enterprises LLC, Suwanee, GA (US)

( * ) Notice: Subject to any disclaimer, the term of this patent is extended or adjusted under 35 U.S.C. 154(b) by 617 days.

(21) Appl. No.: 15/173,977

(22) Filed: Jun. 6, 2016

(65) Prior Publication Data

US 2016/0358132 A1    Dec. 8, 2016

Related U.S. Application Data

(60) Provisional application No. 62/171,350, filed on Jun. 5, 2015.

(51) Int. Cl.
*G06Q 20/06* (2012.01)
*G06Q 20/12* (2012.01)
(Continued)

(52) U.S. Cl.
CPC ......... *G06Q 20/065* (2013.01); *G06Q 20/123* (2013.01); *G06Q 20/227* (2013.01);
(Continued)

(58) Field of Classification Search
None
See application file for complete search history.

(56) References Cited

U.S. PATENT DOCUMENTS

| | | | |
|---|---|---|---|
| 6,850,252 B1* | 2/2005 | Hoffberg | G06K 9/00369 348/E7.061 |
| 7,420,956 B2* | 9/2008 | Karaoguz | H04L 65/1101 370/320 |

(Continued)

OTHER PUBLICATIONS

Andreas M. Antonopoulos, Dec. 2014, O'Reilly Media, Inc., Mastering Bitcoin—First edition, copyright, chapter 4, chapter 5.*

(Continued)

*Primary Examiner* — Jacob C. Coppola
(74) *Attorney, Agent, or Firm* — Panitch Schwarze Belisario & Nadel

(57) ABSTRACT

Methods, systems, and computer readable media described herein are operable to facilitate a virtual currency transaction through a customer premise equipment (CPE) device. A subscriber may use a CPE device to access content offered within a content marketplace, and the CPE device may be configured to provide the subscriber with an option for purchasing content using a virtual currency. The CPE device may be configured with or may have access to a virtual currency account/wallet associated with the subscriber, and the CPE device may carry out the transaction by submitting payment information to a payee or to an upstream payment facilitating server. The virtual currency account/wallet may be installed at the CPE and may be encrypted with a subscriber PIN/password. The CPE device may provide one or more user interfaces that guide a subscriber through the process of transferring virtual currency funds in exchange for a content item.

18 Claims, 8 Drawing Sheets

(51) Int. Cl.
*G06Q 20/22* (2012.01)
*G06Q 20/36* (2012.01)
*G06Q 20/32* (2012.01)
*G06Q 20/30* (2012.01)
*G06Q 20/40* (2012.01)
*G06Q 30/06* (2012.01)

(52) U.S. Cl.
CPC ....... *G06Q 20/306* (2020.05); *G06Q 20/3276* (2013.01); *G06Q 20/36* (2013.01); *G06Q 20/3674* (2013.01); *G06Q 20/4012* (2013.01); *G06Q 30/0643* (2013.01)

(56) References Cited

U.S. PATENT DOCUMENTS

| | | | | |
|---|---|---|---|---|
| 7,789,757 | B2* | 9/2010 | Gemelos | A63F 13/12 463/42 |
| 8,194,681 | B2* | 6/2012 | Kaarela | H04L 67/1061 370/401 |
| 9,275,389 | B1* | 3/2016 | Dides | G06Q 20/405 |
| 10,055,715 | B1* | 8/2018 | Grassadonia | G06Q 20/065 |
| 10,262,321 | B1* | 4/2019 | Ramanathan | G06Q 20/3678 |
| 2002/0038287 | A1* | 3/2002 | Villaret | G06Q 20/105 705/41 |
| 2002/0095389 | A1* | 7/2002 | Gaines | G06Q 20/04 705/67 |
| 2002/0123971 | A1* | 9/2002 | Maritzen | G06Q 20/02 705/64 |
| 2003/0139980 | A1* | 7/2003 | Hamilton | G06Q 30/0641 348/E7.073 |
| 2004/0006536 | A1* | 1/2004 | Kawashima | G06Q 20/04 705/39 |
| 2005/0055716 | A1* | 3/2005 | Louie | H04N 21/41265 725/63 |
| 2005/0138193 | A1* | 6/2005 | Encarnacion | H04L 67/02 709/230 |
| 2006/0265427 | A1* | 11/2006 | Cohen | G06Q 99/00 |
| 2007/0016936 | A1 | 1/2007 | Okada et al. | |
| 2007/0039020 | A1* | 2/2007 | Cansler, Jr. | H04N 5/44513 725/37 |
| 2007/0157251 | A1* | 7/2007 | Shrivastava | H04N 5/44513 725/60 |
| 2008/0178238 | A1* | 7/2008 | Khedouri | G06F 17/30038 725/109 |
| 2008/0235104 | A1* | 9/2008 | Chow | G06Q 20/102 705/27.1 |
| 2008/0235278 | A1* | 9/2008 | Piepenbrink | G06Q 30/02 705/14.69 |
| 2009/0271817 | A1* | 10/2009 | White | H04N 21/4331 725/32 |
| 2012/0130851 | A1 | 5/2012 | Minnick et al. | |
| 2012/0203697 | A1* | 8/2012 | Morgan | H04W 12/06 705/44 |
| 2012/0209749 | A1 | 8/2012 | Hammad et al. | |
| 2012/0209770 | A1* | 8/2012 | Peruvemba | G06Q 30/06 705/44 |
| 2012/0222055 | A1 | 8/2012 | Schaefer et al. | |
| 2012/0259698 | A1* | 10/2012 | Yurow | G06Q 20/32 705/14.51 |
| 2012/0310826 | A1* | 12/2012 | Chatterjee | G06Q 20/36 705/41 |
| 2013/0013499 | A1* | 1/2013 | Kalgi | G06Q 20/12 705/41 |
| 2013/0019268 | A1* | 1/2013 | Fitzsimmons | H04N 21/2542 725/60 |
| 2014/0046848 | A1* | 2/2014 | Radu | G06Q 20/40 705/44 |
| 2014/0259182 | A1* | 9/2014 | Mershon | G06F 21/10 726/28 |
| 2014/0337175 | A1* | 11/2014 | Katzin | G06Q 20/204 705/26.62 |
| 2015/0026049 | A1* | 1/2015 | Theurer | G06Q 20/36 705/41 |
| 2015/0039517 | A1 | 2/2015 | Liberty et al. | |
| 2015/0262176 | A1* | 9/2015 | Langschaedel | G06Q 20/0658 705/71 |
| 2015/0324789 | A1* | 11/2015 | Dvorak | G06Q 20/3823 705/67 |
| 2015/0332224 | A1* | 11/2015 | Melika | G06Q 20/3678 705/71 |
| 2015/0356555 | A1* | 12/2015 | Pennanen | G06Q 20/06 705/71 |
| 2015/0371224 | A1* | 12/2015 | Lingappa | G06Q 20/3829 705/71 |
| 2016/0260091 | A1* | 9/2016 | Tobias | G06Q 20/3678 |
| 2017/0064398 | A1* | 3/2017 | Ventrapragada | H04N 21/4784 |
| 2017/0098216 | A1* | 4/2017 | Studnitzer | G06Q 20/42 |

OTHER PUBLICATIONS

Antonopoulos, Andreas, Mastering Bitcoin, O'Reilly, all pages. (Year: 2014).*

Bonneau et al., SoK: Research Perspectives and Challenges for Bitcoin and Cryptocurrencies, IEEE, all pages. (Year: 2015).*

PCT Search Report & Written Opinion, RE: Application No. PCT/US2016/036037, dated Aug. 22, 2016.

* cited by examiner

VIRTUAL WALLET FOR CUSTOMER PREMISE EQUIPMENT DEVICE

CROSS REFERENCE TO RELATED APPLICATION

This application is a non-provisional application claiming the benefit of U.S. Provisional Application Ser. No. 62/171,350, entitled "Virtual Wallet for Customer Premise Equipment Device," which was filed on Jun. 5, 2015, and is incorporated herein by reference in its entirety.

TECHNICAL FIELD

This disclosure relates to the transfer and management of virtual currency at a customer premise equipment device.

BACKGROUND

Televisions have traditionally been used only as a device to display/render content, even when the content originates from different sources such as game consoles, independent playback devices, and live television streaming. Customer premise equipment (CPE) devices, such as the set-top box (STB), have been gradually moving the television experience towards having a powerful platform capable of replacing or otherwise functioning as a game console, digital video recorder (DVR) device, internet and social networks access device, and receiver of live and video-on-demand (VOD) content that is provided not only from multiple systems operators (MSOs), but also from third party providers like Netflix, YouTube, individuals, and others. As an example, individuals may create applications, video games, video/audio content, and other forms of multimedia content, and may publish the created content in a content marketplace (e.g., a marketplace accessible by a STB). Subscribers may then be able to browse, install and/or consume content in the marketplace using a CPE device such as a STB. However, new techniques for delivering content from a third party to a subscriber will generally require some form of payment. Therefore, it is desirable to improve upon methods and systems for facilitating transactions between third parties and subscribers through a CPE device.

BRIEF DESCRIPTION OF THE DRAWINGS

Like reference numbers and designations in the various drawings indicate like elements.

DETAILED DESCRIPTION

Figure 1:
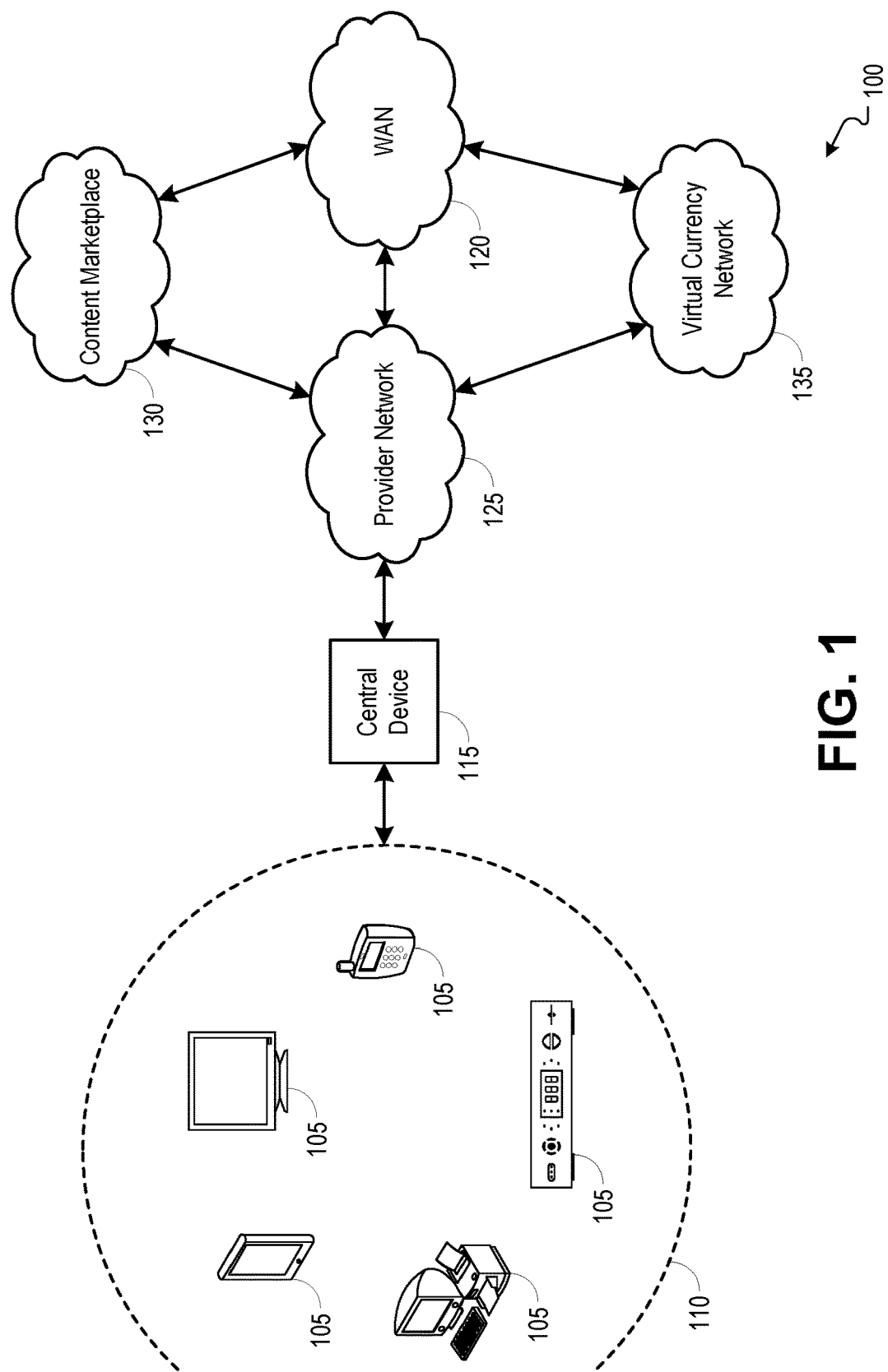
FIG. 1 is a block diagram illustrating an example network environment operable to facilitate a virtual currency transaction through a customer premise equipment (CPE) device.

It is desirable to improve upon methods and systems for facilitating transactions between third parties and multiple systems operator (MSO) subscribers. A CPE device may be configured to provide an application and user interface allowing a subscriber to pay for content using a virtual currency. Methods, systems, and computer readable media described herein are operable to facilitate a virtual currency transaction through a customer premise equipment (CPE) device. A subscriber may use a CPE device to access content offered within a content marketplace, and the CPE device may be configured to provide the subscriber with an option for purchasing content using a virtual currency. The CPE device may be configured with or may have access to a virtual currency account/wallet associated with the subscriber, and the CPE device may carry out the transaction by submitting payment information to a payee or to an upstream payment facilitating server. The virtual currency account/wallet may be installed at the CPE and may be encrypted with a subscriber PIN/password. The CPE device may provide one or more user interfaces that guide a subscriber through the process of transferring virtual currency funds in exchange for a content item.

An embodiment of the invention described herein may include a method comprising: (a) receiving, at a customer premise equipment device, a user selection of a content item; (b) outputting a user interface comprising information associated with one or more payment options for gaining access to the content item, wherein the one or more payment options comprise at least one option for using a virtual currency; (c) in response to receiving a user selection of an option to pay for the content item using a virtual currency, outputting a user interface comprising information associated with one or more virtual currency accounts; (d) in response to receiving a user confirmation of paying for the content item using a selected virtual currency account, initiating a transfer of funds from the selected virtual currency account to a payee account identified from the information associated with payment options for gaining access to the content item; (e) retrieving the content item; and (f) outputting the content item for playback.

According to an embodiment of the invention, the content item is retrieved from a content marketplace.

According to an embodiment of the invention, the user interface comprising information associated with one or more virtual currency accounts further comprises a quick response code that includes information for paying for the content item with funds from a virtual currency account.

According to an embodiment of the invention, the transfer of funds from the selected virtual currency account is initiated using virtual currency account information stored at the customer premise equipment device.

According to an embodiment of the invention, the virtual currency account information is encrypted.

According to an embodiment of the invention, the content item is retrieved by the customer premise equipment device and output for playback in response to receiving a confirmation that the transfer of funds from the selected virtual currency account to the identified payee account has been successfully completed.

According to an embodiment of the invention, the method described herein further comprises, after initiating the transfer of funds from the selected virtual currency account to the identified payee account, and before outputting the content item for playback, outputting a user interface comprising a notification of a current status of a process of confirming the successful transfer of funds from the selected virtual currency account to the identified payee account.

An embodiment of the invention described herein may include an apparatus comprising: (a) one or more interfaces configured to be used to: (i) receive a user selection of a content item; (ii) output a user interface comprising information associated with one or more payment options for gaining access to the content item, wherein the one or more payment options comprise at least one option for using a virtual currency; (iii) output a user interface comprising information associated with one or more virtual currency accounts in response to receiving a user selection of an option to pay for the content item using a virtual currency; (b) a module configured to initiate a transfer of funds from the selected virtual currency account to a payee account identified from the information associated with payment options for gaining access to the content item in response to receiving a user confirmation of paying for the content item using a selected virtual currency account; and (c) wherein the one or more interfaces are further configured to be used to: (i) retrieve the content item; and (ii) output the content item for playback.

An embodiment of the invention described herein may include one or more non-transitory computer readable media having instructions operable to cause one or more processors to perform the operations comprising: (a) receiving, at a customer premise equipment device, a user selection of a content item; (b) outputting a user interface comprising information associated with one or more payment options for gaining access to the content item, wherein the one or more payment options comprise at least one option for using a virtual currency; (c) in response to receiving a user selection of an option to pay for the content item using a virtual currency, outputting a user interface comprising information associated with one or more virtual currency accounts; (d) in response to receiving a user confirmation of paying for the content item using a selected virtual currency account, initiating a transfer of funds from the selected virtual currency account to a payee account identified from the information associated with payment options for gaining access to the content item; (e) retrieving the content item; and (f) outputting the content item for playback.

According to an embodiment of the invention, the instructions are further operable to cause the one or more processors to perform the operations comprising, after initiating the transfer of funds from the selected virtual currency account to the identified payee account, and before outputting the content item for playback, outputting a user interface comprising a notification of a current status of a process of confirming the successful transfer of funds from the selected virtual currency account to the identified payee account.

FIG. 1 is a block diagram illustrating an example network environment 100 operable to facilitate a virtual currency transaction through a customer premise equipment (CPE) device. In embodiments, video, voice, and/or data services may be delivered to one or more client devices 105. Client devices 105 may include a television, mobile device, tablet, computer, set-top box (STB), telephone, gaming device, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, telephony services, and others. It should be further understood that the devices shown in FIG. 1 may be integrated. For example, a television may be connected to and controlled by a STB.

Multiple services may be delivered to client devices 105 over a local network 110. The local network 110 may include a local area network (LAN), wireless local area network (WLAN), personal area network (PAN), Multimedia over Coax Alliance (MoCA) network, mobile hotspot network, and others. The local network 110 may be provided at a subscriber premise by a central device 115 and/or one or more associated access points. The central device 115 may include any device configured to facilitate communications between a headend device and one or more client devices, such as a STB, multimedia gateway, modem, or other access device. The central device 115 may be integrated with other devices. For example, a modem may reside within a gateway device, STB, or other devices. It will be appreciated by those skilled in the relevant art that delivery of the multiple services over the local network 110 may be accomplished using a variety of standards and formats.

In embodiments, multiple services (e.g., video, voice, and/or data services) may be delivered from a wide-area network (WAN) 120 to the local network 110 through a connection to a provider network 125. The provider network 125 may include an optical network, hybrid fiber coaxial (HFC) network, digital subscriber line (DSL) network, twisted-pair, mobile network, high-speed data network, MoCA network, and any other network configured to deliver one or more services to a subscriber. Multiple systems operator (MSO) devices and/or networks within the WAN 120 may be used to provide, manage, and/or troubleshoot the multiple services provided to subscribers.

It will be appreciated by those skilled in the relevant art that client devices 105 may be capable of interacting and communicating with each other and/or with a central device 115 over various wireless communication standards (e.g., Wi-Fi, Bluetooth, etc.). Client devices 105 connected to a local network 110 may receive services according to one or more subscriptions entered into between a subscriber and service provider.

The central device 115 may facilitate the retrieval of content from a content marketplace 130 via the provider network 125 and/or WAN 120. The central device 115 may further facilitate a virtual currency transaction between a virtual currency network 135, a subscriber (via a client device 105), and a payee identified by the content marketplace 130 (e.g., MSO, third party, etc.). For example, the central device 115 may provide a local wallet application (e.g., a virtual currency wallet application) and a network connection to facilitate a transaction between the local wallet application and the virtual currency network 135. In embodiments, the central device 115 may provide a quick response (QR) code and network connection to facilitate a transaction between a remote device (e.g., client device 105 such as a mobile device, tablet, etc.) and the virtual currency network 135.

It should be understood that any form of virtual transactions/currency may be made available to subscribers in a CPE (e.g., STB) environment to allow third party content providers or individuals to receive compensation for the content they published in a STB market place (e.g., content marketplace 130). Virtual currencies may be used since they allow individuals to send money directly to other individuals or entities in a virtual environment. For example, crypto-currencies (e.g., Bitcoin, Litecoin, Dogecoin, etc.) may be used, which not only provide the possibility of financial transactions in a virtual environment, but also allow transactions to be made from end to end without any intermediary actor like a bank or financial institution. The central device 115 may be configured with an application that allows the subscriber to perform transactions with crypto-currencies like Bitcoin to rent or purchase content.

In embodiments, a virtual currency wallet application installed at the central device 115 may be used to rent a content item (e.g., VoD item offered within the content marketplace 130). The virtual currency wallet application may be accessed and controlled by a subscriber through a user interface (e.g., graphical user interface (GUI)). In embodiments, a content item offered for lease or purchase within the content marketplace 130 may be displayed to a subscriber along with instructions to allow payment with a virtual currency, along with the price expressed in a value associated with the virtual currency (e.g., BTC is the value associated with Bitcoin) and payment information such as a destination address associated with a virtual currency account/wallet of the payee (content provider or originator).

In embodiments, using the virtual currency wallet application installed at the central device 115, the subscriber may setup a local wallet (e.g., module accessed by the virtual currency application to reach the virtual currency account/wallet associated with the subscriber) by setting a PIN/password which is used to encrypt the data of the local wallet (e.g., virtual currency account information such as a private key (PK) or seed for a Bitcoin address). The central device 115 may store information associated with a subscriber's virtual currency account/wallet. A subscriber may own an address associated with a virtual currency (e.g., Bitcoin address), and the address may be associated with a PK. The PK may be used to execute (e.g., by signing the transaction request cryptographically) transactions. For example, the PK may be all that is needed to move/transfer virtual currency funds. In order to protect the PK, a PIN/password may be used to encrypt and store the PK at the central device 115.

In embodiments, the trigger for initiating the virtual currency application at the central device 115 may include any attempt by a subscriber to purchase/rent content for which virtual currency is a payment option. For example, the trigger may be the subscriber selecting a VoD item for renting from the content marketplace 130.

While only a few virtual currency types are mentioned herein, it should be understood that this disclosure is meant to cover any crypto-currency and other currency types as well. Moreover, it will be appreciated by those skilled in the relevant art that the techniques described herein may be used to facilitate purchases and leases of various types of content and various other types of transactions, and that various types of user interfaces may be used to allow a subscriber to control the virtual currency transaction.

Figure 2:
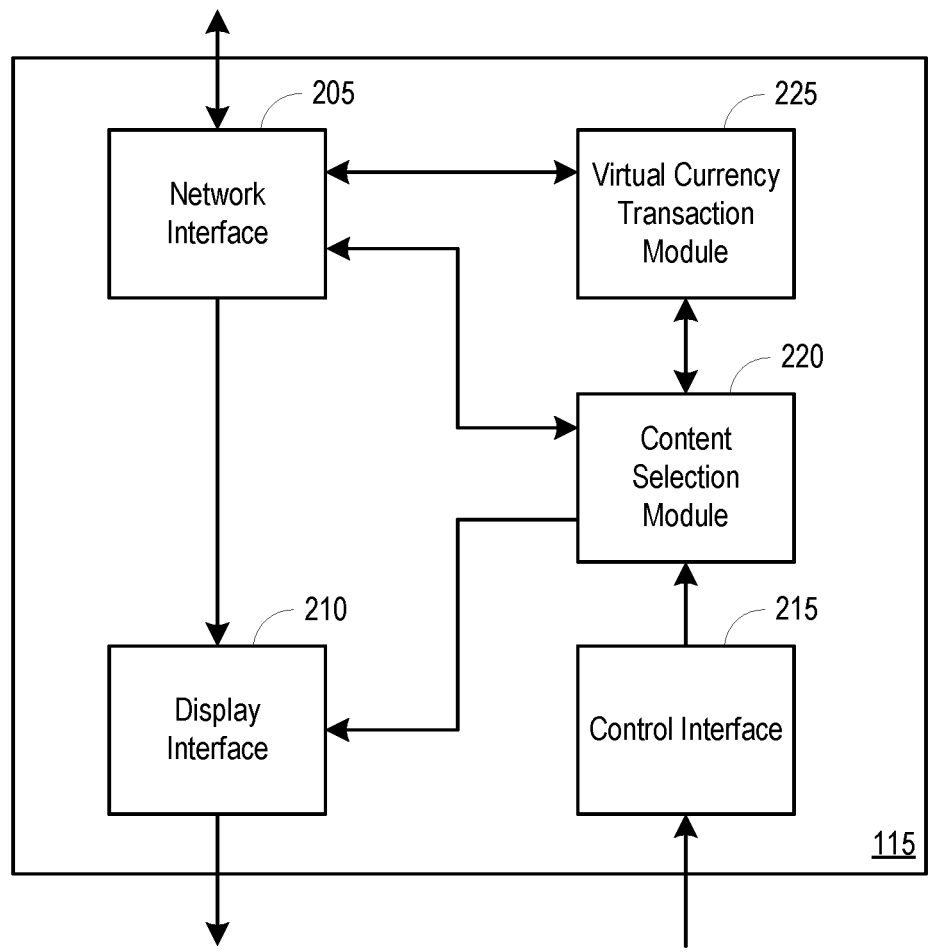
FIG. 2 is a block diagram illustrating an example central device operable to facilitate a virtual currency transaction through a customer premise equipment (CPE) device.

FIG. 2 is a block diagram illustrating an example central device 115 operable to facilitate a virtual currency transaction through a customer premise equipment (CPE) device. In embodiments, the CPE device through which a virtual currency transaction is carried out may be a central device 115. The central device 115 may include a network interface 205, a display interface 210, a control interface 215, a content selection module 220, and a virtual currency transaction module 225. In embodiments, the central device 115 may be a STB, multimedia gateway, or any other device configured to deliver content or other services to one or more client devices (e.g., client devices 105 of FIG. 1).

In embodiments, the central device 115 may receive one or more services as downstream communications and may output upstream communications via a network interface 205. It should be understood that the network interface 205 may include various interfaces configured to be used to output and receive a variety of communication types (e.g., video, data, voice, wireless, etc.).

In embodiments, the content selection module 220 may facilitate the retrieval of content from an upstream content server (e.g., content marketplace 130 of FIG. 1) through the network interface 205. Content retrieved through the network interface 205 may be output to a connected display device or to a client device through the display interface 210. It should be understood that content may be output through the display interface 210 via a wireless connection or association with a display device or client device (e.g., client device 105 of FIG. 1). The content selection module 220 may provide one or more user interfaces displaying available content items and details associated with each item for paying for the item. The user interface displays may be output to a display device or associated client device through the display interface 210. The content selection module 220 may provide one or more user interfaces displaying user selectable options for purchasing content with a virtual currency account and may show a status of a transaction.

In embodiments, the virtual currency transaction module 225 may facilitate a virtual currency transaction between a virtual currency network (e.g., virtual currency network 135 of FIG. 1), a subscriber, and/or a payee (e.g., MSO, third party, etc.) associated with a purchased or rented piece of content. A content item (e.g., VoD item or other piece of content) offered for lease or purchase (e.g., content offered within a content marketplace 130 of FIG. 1) may be displayed to a subscriber along with instructions to allow payment with a virtual currency, along with the price expressed in a value associated with the virtual currency (e.g., BTC is the value associated with Bitcoin) and payment information such as a destination address associated with a virtual currency account/wallet of the payee (content provider or originator). The virtual currency transaction module 225 may be configured with a subscriber's virtual currency account information (e.g., PK or seed, account address, etc.), and the account information may be protected or encrypted by setting a PIN/password for the subscriber account. The virtual currency transaction module 225 may access the virtual currency account information to execute a transfer of virtual currency funds from the subscriber account to a payee account in exchange for purchased or rented content.

In embodiments, the trigger for the virtual currency transaction module 225 to initiate a transfer of virtual currency funds may include any attempt by a subscriber to purchase/rent content for which virtual currency is a payment option. For example, the trigger may be a command received through the control interface 215 that informs the content selection module 220 of a user's selection of an option to pay for a content item using a virtual currency.

Figure 3:
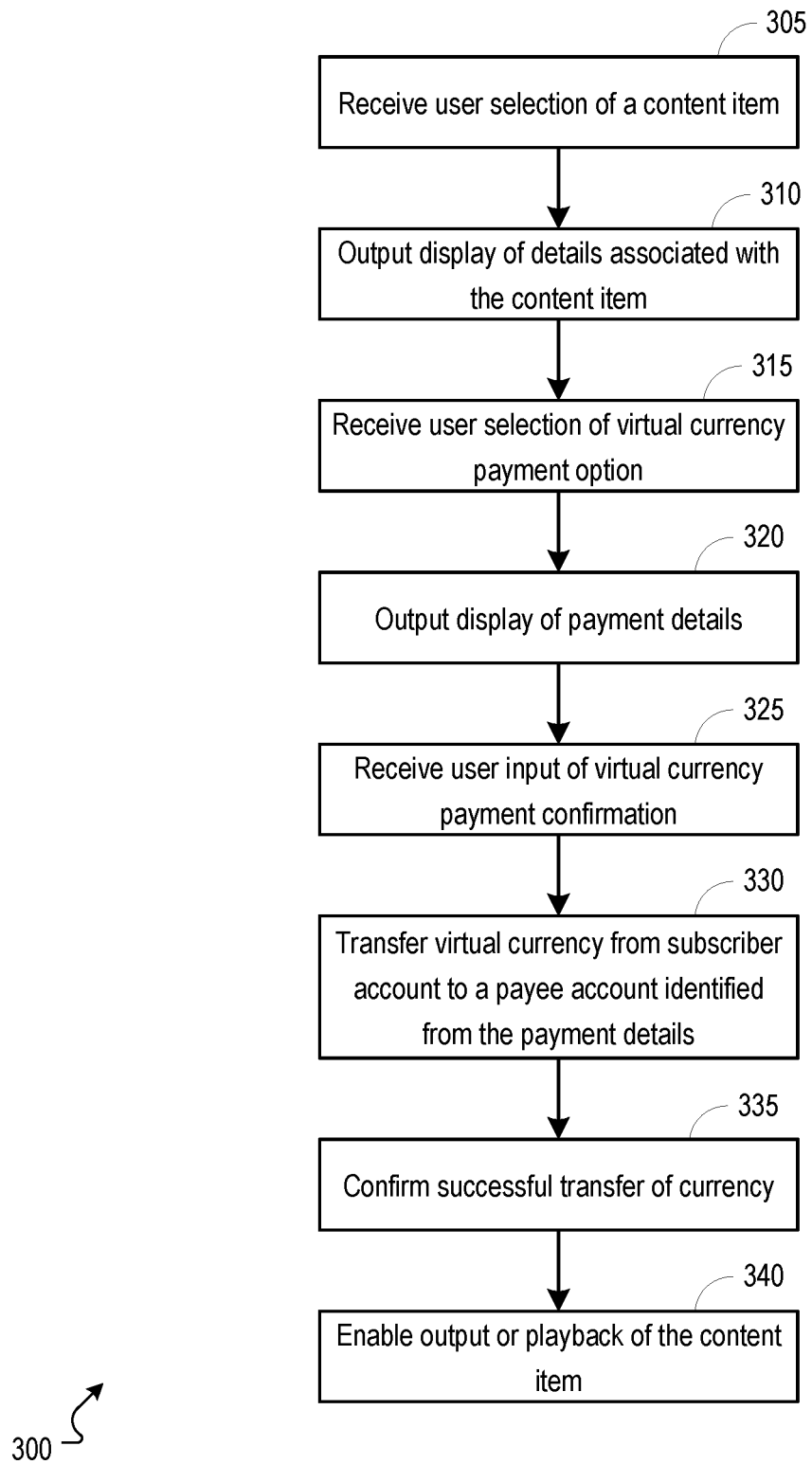
FIG. 3 is a flowchart illustrating an example process operable to facilitate a virtual currency transaction through a customer premise equipment (CPE) device.

FIG. 3 is a flowchart illustrating an example process 300 operable to facilitate a virtual currency transaction through a customer premise equipment (CPE) device. The process 300 can begin at 305, when a user selection of a content item is received at a CPE device (e.g., central device 115 of FIG. 1). The content item may be a VoD item, or other piece of content that is available to a subscriber for purchase. A user selection of the content item may be received at a control interface 215 of FIG. 2 (e.g., from a control device such as a remote control unit (RCU) or a client device 105 of FIG. 1).

At 310, details associated with the content item may be output as a display. Details associated with the content item may be output as a display, for example, by the content selection module 220 of FIG. 2. Details associated with a content item may include a price for purchasing or renting the content item (e.g., expressed in a virtual currency), options for paying for the content item, and various other information associated with the content item (e.g., content title, summary, length, reviews, etc.).

At 315, a user selection of a virtual currency payment option may be received. The user selection may be received, for example, by the CPE device (e.g., recognized by the content selection module 220 of FIG. 2).

At 320, a display of payment details may be output from the CPE device. The display of payment details may be output, for example, by the content selection module 220 of FIG. 2. In embodiments, the content selection module 220 may generate the display based upon information associated with a virtual currency wallet or account retrieved from the virtual currency transaction module 225 of FIG. 2. The display may include a screen associated with a virtual currency wallet where a confirmation message is shown with an amount to be paid along with various other payment/payee information (e.g., a virtual currency destination address). The display may further prompt the subscriber for the input of information, for example, by requesting a PIN/password associated with the virtual currency wallet or virtual currency account associated with the subscriber, wherein the PIN/password is to be entered for confirming the payment. In embodiments, the display may include a QR code that is associated with the virtual currency payment option and may include data associated with the payment/payee. The subscriber can scan the QR code using an external device (e.g., client device 105 of FIG. 1 such as a tablet, mobile device, etc.) in order to make a payment. For example, the QR code of the destination address associated with the payee virtual currency account may be automatically generated and displayed in order to allow payments by the subscriber using an external wallet (e.g., client device 105 of FIG. 1 such as a tablet, mobile device, etc.).

At 325, a user input confirming payment via the virtual currency may be received at the CPE device. The user input may be recognized, for example, by the content selection module 220 of FIG. 2. The user may verify that the payment information displayed in the user interface is correct and can enter a virtual currency account or virtual currency wallet PIN/password to confirm the payment. It should be understood that the virtual currency application may be configured to save the PIN/password such that the user does not have to re-enter the PIN/password for each transaction.

At 330, a virtual currency payment may be transferred from the subscriber account to a payee account identified from the payment details. The virtual currency transfer may be made, for example, by the virtual currency transaction module 225 of FIG. 2. In embodiments, the virtual currency transaction module 225 may access account information (e.g., account number, password, private key (PK) or seed, signature, etc.) associated with a user account that was selected for providing funds to be used as payment for the selected content item. The virtual currency transaction module 225 may initiate the transaction by broadcasting the value transfer to a virtual currency account/address identified as a payee account within the details associated with the content item.

At 335, a successful transfer of the virtual currency from the user account to the payee account may be confirmed. The successful transfer may be confirmed, for example, by the virtual currency transaction module 225 of FIG. 2. In embodiments, the virtual currency transaction module 225 may monitor the status of the virtual currency transaction (e.g., confirmation or mining process) and may inform the user of the confirmation status by generating and outputting a display within a user interface. The user interface may display content details with a status signaling that the payment is in progress. In embodiments, a first or initial confirmation from a virtual currency network (e.g., virtual currency network 135 of FIG. 1) may allow the CPE device to assume that the transaction will be successful. The CPE device may be configured to assume that the transaction will be successful when the cost of the content item is below a predetermined threshold price, when details associated with the content item allow for an early (premature) confirmation of successful transfer to be made, and/or based on other settings or factors.

At 340, output or playback of the content item may be enabled. The content item may be retrieved, for example, by the CPE device from an upstream server (e.g., VoD server, content marketplace 130 of FIG. 1, or other content server), and playback of the content item may be output to a display device connected to the CPE device or may be transmitted to a client device (e.g., client device 105 of FIG. 1) for playback at the client device. In embodiments, the content item may be stored or temporarily retained within storage at the CPE device or at an associated client device.

Figure 4:
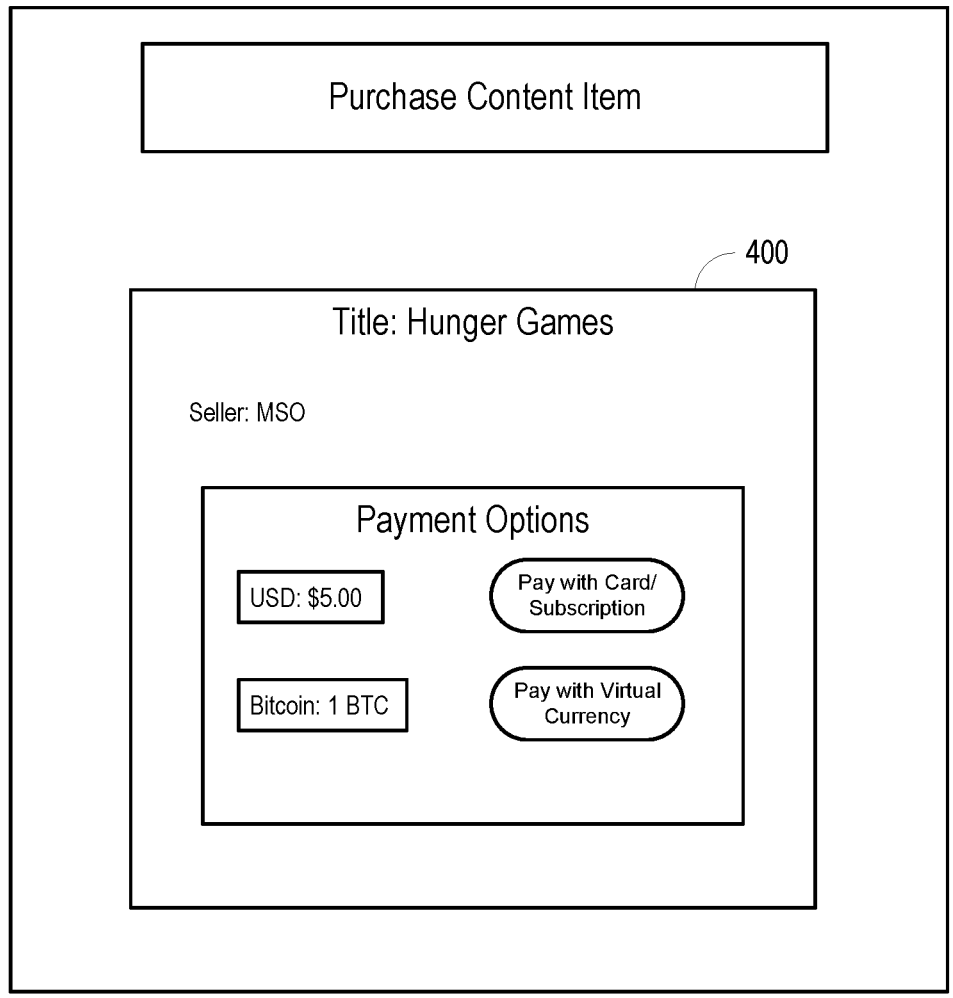
FIG. 4 shows an example user interface that may be displayed to a subscriber when the subscriber selects a piece of content to be purchased/rented.

FIG. 4 shows an example user interface 400 that may be displayed to a subscriber when the subscriber selects a piece of content to be purchased/rented. The user interface 400 may be output by a CPE device (e.g., central device 115 of FIG. 1) as a display. In embodiments, when the subscriber selects a content item (e.g., a piece of VoD content), the user interface may display information associated with the content (e.g., title, seller/payee, summary information, price, etc.) along with information associated with options for paying for the content. The subscriber can choose a payment option (e.g., paying with a credit card or paying with virtual currency via a virtual currency wallet application). If the content may be purchased using a virtual currency (e.g., the content seller accepts virtual currency), then the subscriber can choose to pay for the content using a virtual currency account. It should be understood that the CPE device may provide the information to facilitate a transfer of funds between the payee and payor.

Figure 5:
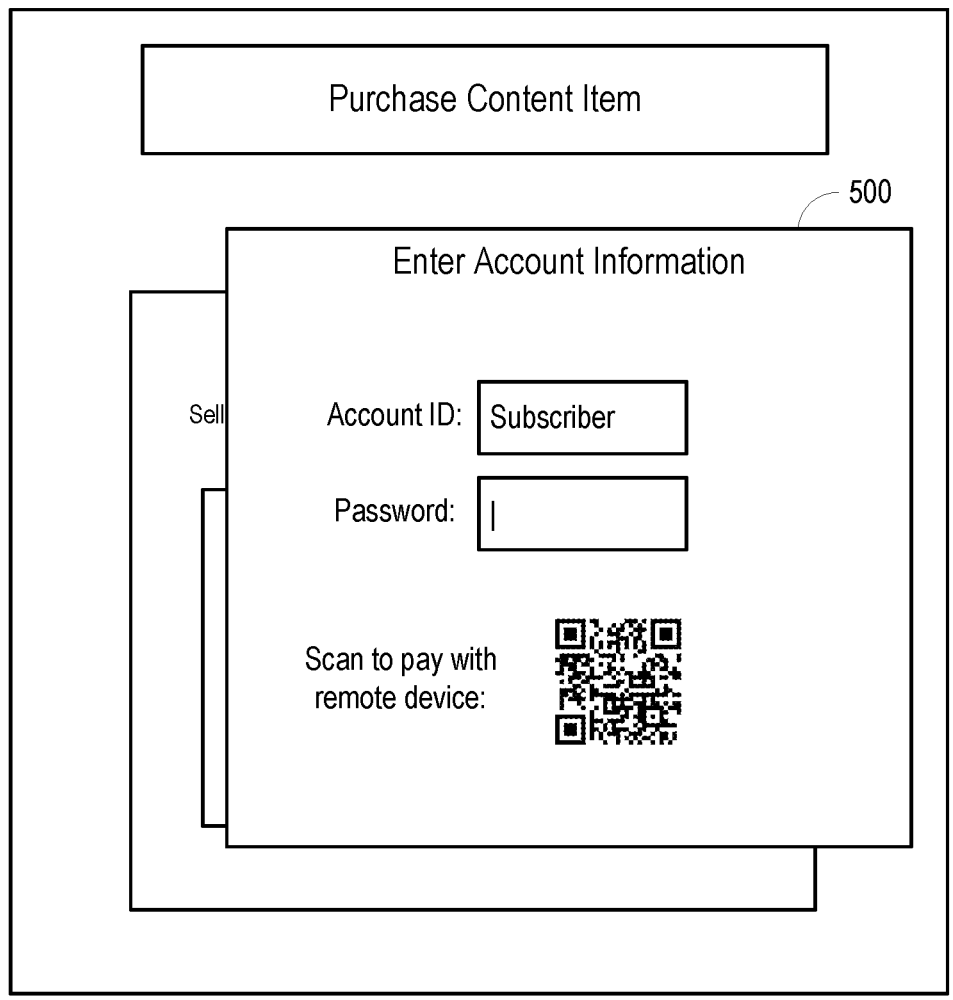
FIG. 5 shows an example user interface that may be displayed after a subscriber chooses to pay for content using a virtual currency.

FIG. 5 shows an example user interface 500 that may be displayed after a subscriber chooses to pay for content using a virtual currency. The user interface 500 may be output by a CPE device (e.g., central device 115 of FIG. 1) as a display. The subscriber may enter a virtual currency account ID and/or a password or PIN associated with the virtual currency account/wallet. The password or PIN may be associated with a virtual currency wallet application being run on a CPE device such as a central device 115 of FIG. 1. In embodiments, a QR code may be displayed on the user interface, and the subscriber can scan the QR code using a remote device to pay for the content using an application being run on a remote device.

Figure 6:
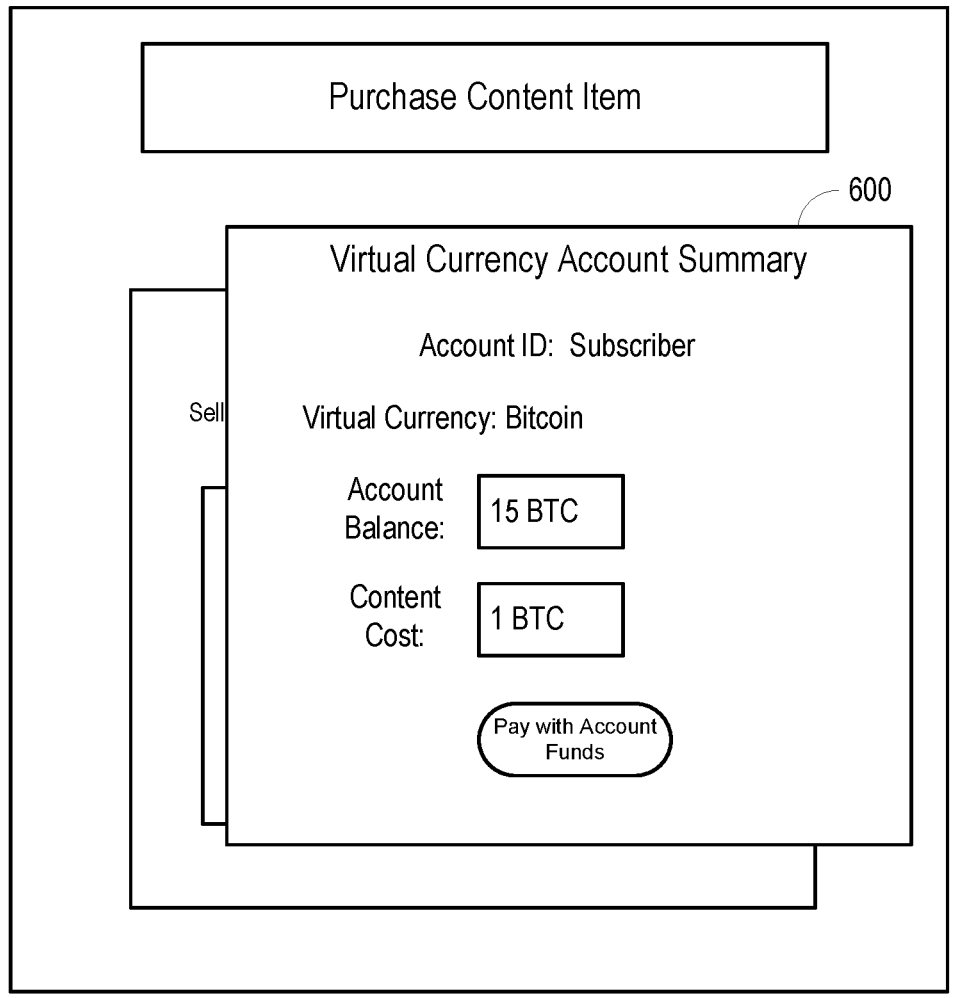
FIG. 6 shows an example user interface that may be displayed after subscriber information has been received.

FIG. 6 shows an example user interface 600 that may be displayed after subscriber information (e.g., ID, password, PIN, etc.) has been received. The user interface 600 may be output by a CPE device (e.g., central device 115 of FIG. 1) as a display. The user interface 600 may display account information associated with one or more virtual currency accounts (e.g., Bitcoin or other virtual currency account). For example, the user interface 600 may display the currency amount that is associated with a virtual currency account (e.g., Subscriber has 15 BTC in the associated Bitcoin account). The user interface 600 may further display the cost of the selected content, and the user can decide whether to purchase the content using the selected virtual currency account.

Figure 7:
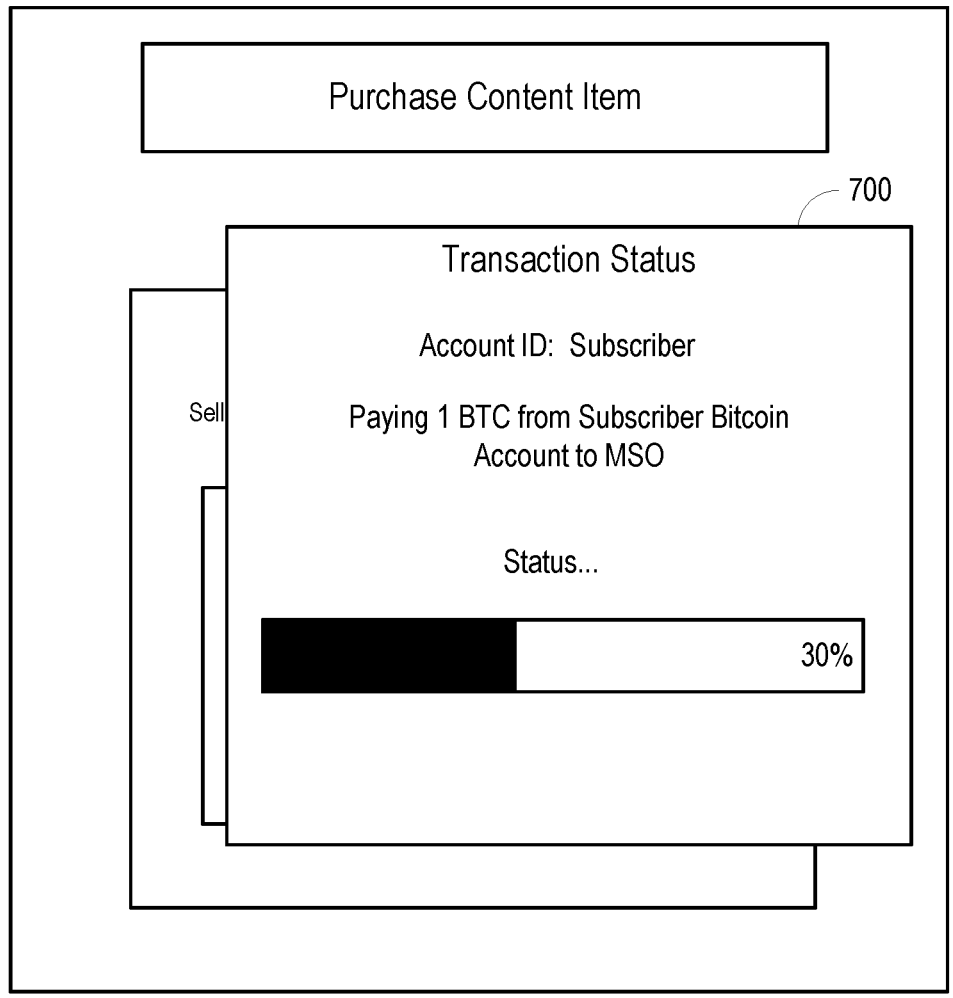
FIG. 7 shows an example user interface that may display the status of an ongoing virtual currency transaction.

FIG. 7 shows an example user interface 700 that may display the status of an ongoing virtual currency transaction. The user interface 700 may be output by a CPE device (e.g., central device 115 of FIG. 1) as a display. After a subscriber decides to pay for selected content using a virtual currency account, the transaction can begin at the CPE device, and the user interface 700 can update and show the current status of the transaction to the subscriber. In embodiments, if a user scans a QR code (e.g., QR code presented in the interface shown in FIG. 5) to initiate a payment for content, the CPE device may detect the transaction and may cause the transaction status interface of FIG. 7 to be displayed.

Figure 8:
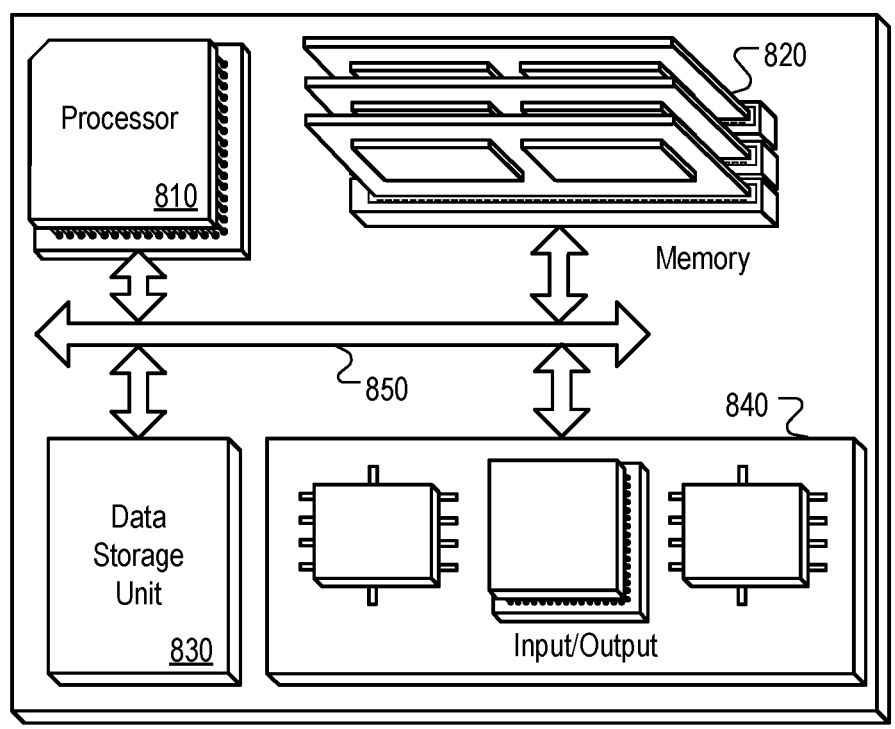
FIG. 8 is a block diagram of a hardware configuration operable to facilitate a virtual currency transaction through a customer premise equipment (CPE) device.

FIG. 8 is a block diagram of a hardware configuration 800 operable to facilitate a virtual currency transaction through a customer premise equipment (CPE) device. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In one implementation, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, STB, computer, mobile device, tablet, etc.). In another implementation, the input/output device can include driver devices configured to send communications to, and receive communications from one or more networks (e.g., local network 110 of FIG. 1, provider network 125 of FIG. 1, WAN 120 of FIG. 1, content marketplace 130 of FIG. 1, virtual currency network 135 of FIG. 1, etc.).

Those skilled in the art will appreciate that the invention improves upon methods and systems for purchasing content using a virtual currency. Methods, systems, and computer readable media described herein are operable to facilitate a virtual currency transaction through a customer premise equipment (CPE) device. A subscriber may use a CPE device to access content offered within a content marketplace, and the CPE device may be configured to provide the subscriber with an option for purchasing content using a virtual currency. The CPE device may be configured with or may have access to a virtual currency account/wallet associated with the subscriber, and the CPE device may carry out the transaction by submitting payment information to a payee or to an upstream payment facilitating server. The virtual currency account/wallet may be installed at the CPE and may be encrypted with a subscriber PIN/password. The CPE device may provide one or more user interfaces that guide a subscriber through the process of transferring virtual currency funds in exchange for a content item.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
receiving, via a local network and at a customer premise equipment device comprising a set-top box, a user selection of a content item made via a client device separate from the customer premise equipment device;
outputting, via the local network and by the customer premise equipment device, a first user interface for display on the client device, the first user interface comprising information associated with the content item, wherein the information associated with the content item comprises a price of the content item and one or more payment options for paying for the content item, wherein the one or more payment options comprise an option to pay for the content item using a virtual currency;
selecting, via the client device, the option to pay for the content item using the virtual currency;
receiving, via the customer premise equipment device, the selection of the option to pay for the content item using the virtual currency;
outputting, via the local network and by the customer premise equipment device, a second user interface for display on the client device, the second user interface comprising information associated with one or more virtual currency accounts, wherein the second user interface comprises the price of the content item, the price being expressed in a value associated with the virtual currency for each of the one or more virtual currency accounts, and a destination address associated with a payee virtual currency account, the payee virtual currency account comprising one or more virtual currency accounts of a payee;
in response to receiving a user confirmation of paying for the content item using a selected virtual currency account, the customer premise equipment device: retrieving a private key associated with the selected virtual currency account, wherein the private key is retrieved from storage at the customer premise equipment device; retrieving an account address associated with the selected virtual currency account, wherein the account address is retrieved from storage at the customer premise equipment device; and initiating a transfer of funds from the selected virtual currency account to the payee virtual currency account, wherein the transfer of funds is executed by using the private key and account address retrieved from the customer premise equipment device;
after initiating the transfer of funds from the selected virtual currency account to the identified payee virtual currency account, and before outputting the content item for playback, outputting, via the local network and from the customer premise equipment device, a third user interface for display on the client device, the third user interface comprising a notification of a current status of a process of confirming a successful transfer of funds from the selected virtual currency account to the identified payee virtual currency account; and
retrieving, by the customer premise equipment device, the content item from a multimedia content provider, and outputting the content item for playback.

2. The method of claim 1, wherein the content item is retrieved from a content marketplace.

3. The method of claim 1, wherein the second user interface further comprises a quick response code that includes information for paying for the content item with funds from a virtual currency account.

4. The method of claim 1, wherein the transfer of funds from the selected virtual currency account is initiated using virtual currency account information stored at the customer premise equipment device.

5. The method of claim 4, wherein the virtual currency account information is encrypted.

6. The method of claim 1, wherein the content item is retrieved by the customer premise equipment device and output for playback in response to receiving a confirmation that the transfer of funds from the selected virtual currency account to the identified payee account has been successfully completed.

7. A system comprising a customer premise equipment device comprising a set-top box and a client device separate from the customer premise equipment device, the system further comprising:
a first processor of the customer premise equipment device and a second processor of the client device; and a first memory of the customer premise equipment device and a second memory of the client device, the first memory and the second memory storing respective first and second instruction sets that, when executed respectively by the first processor and second processor, cause the system to perform a method, the method comprising:
receiving, via a local network and at the customer premise equipment device, a user selection of a content item made via the client device;
outputting, via the local network and by the customer premise equipment device, a first user interface for display on the client device, the first user interface comprising information associated with the content item, wherein the information associated with the content item comprises a price of the content item and one or more payment options for paying for the content item, wherein the one or more payment options comprise an option to pay for the content item using a virtual currency;
selecting, via the client device, the option to pay for the content item using the virtual currency;
receiving, via the customer premise equipment device, the selection of the option to pay for the content item using the virtual currency;
outputting, via the local network and by the customer premise equipment device, a second user interface for display on the client device, the second user interface comprising information associated with one or more virtual currency accounts, wherein the second user interface comprises the price of the content item, the price being expressed in a value associated with the virtual currency for each of the one or more virtual currency accounts, and a destination address associated with a payee virtual currency account, the payee virtual currency account comprising one or more virtual currency accounts of a payee;
in response to receiving a user confirmation of paying for the content item using a selected virtual currency account, the customer premise equipment device: retrieving a private key associated with the selected virtual currency account, wherein the private key is retrieved from storage at the customer premise equipment device; retrieving an account address associated with the selected virtual currency account, wherein the account address is retrieved from storage at the customer premise equipment device; and initiating a transfer of funds from the selected virtual currency account to the payee virtual currency account, wherein the transfer of funds is executed by using the private key and account address retrieved from the customer premise equipment device;
after initiating the transfer of funds from the selected virtual currency account to the identified payee virtual currency account, and before outputting the content item for playback, outputting, via the local network and from the customer premise equipment device, a third user interface for display on the client device, the third user interface comprising a notification of a current status of a process of confirming a successful transfer of funds from the selected virtual currency account to the identified payee virtual currency account; and
retrieving, by the customer premise equipment device, the content item from a multimedia content provider, and outputting the content item for playback.

8. The system of claim 7, wherein the content item is retrieved from a content marketplace.

9. The system apparatus of claim 7, wherein the second interface further comprises a quick response code that includes information for paying for the content item with funds from a virtual currency account.

10. The system of claim 7, wherein the transfer of funds from the selected virtual currency account is initiated using virtual currency account information stored at the customer premise equipment device.

11. The system of claim 10, wherein the virtual currency account information is encrypted.

12. The system of claim 7, wherein the content item is retrieved by the customer premise equipment device and output for playback in response to receiving a confirmation that the transfer of funds from the selected virtual currency account to the identified payee account has been successfully completed.

13. Non-transitory computer readable media having instructions that, when executed by a first processor and a second processor of a system comprising a customer premise equipment device, which comprises a set-top box, and a client device, cause the system to perform a method, the method comprising:
receiving, via a local network and at the customer premise equipment device, a user selection of a content item made via the client device;
outputting, via the local network and by the customer premise equipment device, a first user interface for display on the client device, the first user interface comprising information associated with the content item, wherein the information associated with the content item comprises a price of the content item and one or more payment options for paying for the content item, wherein the one or more payment options comprise an option to pay for the content item using a virtual currency;
selecting, via the client device, the option to pay for the content item using the virtual currency;
receiving, via the customer premise equipment device, the selection of the option to pay for the content item using the virtual currency;
outputting, via the local network and by the customer premise equipment device, a second user interface for display on the client device, the second user interface comprising information associated with one or more virtual currency accounts, wherein the second user interface comprises the price of the content item, the price being expressed in a value associated with the virtual currency for each of the one or more virtual currency accounts, and a destination address associated with a payee virtual currency account, the payee virtual currency account comprising one or more virtual currency accounts of a payee;
in response to receiving a user confirmation of paying for the content item using a selected virtual currency account, the customer premise equipment device: retrieving a private key associated with the selected virtual currency account, wherein the private key is retrieved from storage at the customer premise equipment device; retrieving an account address associated with the selected virtual currency account, wherein the account address is retrieved from storage at the customer premise equipment device; and initiating a transfer of funds from the selected virtual currency account to the payee virtual currency account, wherein the transfer of funds is executed by using the private key and account address retrieved from the customer premise equipment device;

after initiating the transfer of funds from the selected virtual currency account to the identified payee virtual currency account, and before outputting the content item for playback, outputting, via the local network and from the customer premise equipment device, a third user interface for display on the client device, the third user interface comprising a notification of a current status of a process of confirming a successful transfer of funds from the selected virtual currency account to the identified payee virtual currency account; and retrieving, by the customer premise equipment device, the content item from a multimedia content provider, and outputting the content item for playback.

14. The non-transitory computer-readable media of claim 13, wherein the content item is retrieved from a content marketplace.

15. The non-transitory computer-readable media of claim 13, wherein the second user interface further comprises a quick response code that includes information for paying for the content item with funds from a virtual currency account.

16. The non-transitory computer-readable media of claim 13, wherein the transfer of funds from the selected virtual currency account is initiated using virtual currency account information stored at the customer premise equipment device.

17. The non-transitory computer-readable media of claim 16, wherein the virtual currency account information is encrypted.

18. The non-transitory computer-readable media of claim 13, wherein the content item is retrieved by the customer premise equipment device and output for playback in response to receiving a confirmation that the transfer of funds from the selected virtual currency account to the identified payee account has been successfully completed.

* * * * *